US010850952B2

(12) United States Patent
 Pletz et al.

(10) Patent No.: US 10,850,952 B2
(45) Date of Patent: Dec. 1, 2020

(54) PIPELAYER WITH QUICK ATTACH COUNTERWEIGHTS

(71) Applicant: Brandt Equipment Solutions Ltd., Regina (CA)

(72) Inventors: Michael Pletz, Regina (CA); Daniel Klassen, Regina (CA)

(73) Assignee: Brandt Industries Canada Ltd., Regina (CA)

( * ) Notice: Subject to any disclaimer, the term of this patent is extended or adjusted under 35 U.S.C. 154(b) by 314 days.

(21) Appl. No.: 15/815,894

(22) Filed: Nov. 17, 2017

(65) Prior Publication Data

US 2019/0023540 A1     Jan. 24, 2019

Related U.S. Application Data

(60) Provisional application No. 62/536,594, filed on Jul. 25, 2017.

(30) Foreign Application Priority Data

Jul. 21, 2017   (CA) ...................................... 2974272
Oct. 26, 2017   (CA) ...................................... 2983834

(51) Int. Cl.
  *B66C 23/80*      (2006.01)
  *B66C 23/42*      (2006.01)
  *E21B 19/15*      (2006.01)
  *B66C 25/00*      (2006.01)
  *F16L 1/11*       (2006.01)
      (Continued)

(52) U.S. Cl.
  CPC .............. *B66C 23/80* (2013.01); *B66C 23/42* (2013.01); *B66C 25/00* (2013.01); *E21B 19/15* (2013.01); *F16L 1/11* (2013.01); *B66D 2700/01* (2013.01); *E03F 3/06* (2013.01); *F16L 1/036* (2013.01)

(58) Field of Classification Search
  CPC ......... B66C 23/72; B66C 23/74; B66C 23/76; B66C 23/44
  See application file for complete search history.

(56) References Cited

U.S. PATENT DOCUMENTS 2,130,487 A  *  9/1938  Foley ..................... B66C 23/36
                                             212/298
2,674,378 A  *  4/1954  Meyer .................... B66C 23/74
                                             212/178
(Continued)

FOREIGN PATENT DOCUMENTS

EP          1205422 A1  *  5/2002  ............. B66C 23/74

*Primary Examiner* — Emmanuel M Marcelo
(74) *Attorney, Agent, or Firm* — Frost Brown Todd LLC; Nicole M. Tepe (57) ABSTRACT

A pipelayer machine having a counterweight assembly is provided. The pipelayer machine can include a main body having first and second sides, a first side track provided on the first side of the main body and a second side track provided on the second side of the main body. A side boom can be provided on the first side of the main body. The counterweight assembly can be provided on the second side of the main body and include a counterweight mounting frame. A counterweight can be provided having a first side with an engagement hook extending from the first side. The engagement hook can be used to attach the counterweight to the counterweight mounting frame.

40 Claims, 6 Drawing Sheets

(51) Int. Cl.
*F16L 1/036* (2006.01)
*E03F 3/06* (2006.01)

(56) References Cited

U.S. PATENT DOCUMENTS

| | | | | |
|---|---|---|---|---|
| 2,820,556 A * | 1/1958 | Davis | ...................... | E02F 3/427 |
| | | | | 414/719 |
| 3,266,636 A * | 8/1966 | Dorn | ...................... | B66C 23/44 |
| | | | | 212/196 |
| 3,375,021 A * | 3/1968 | Grider | ...................... | B66C 23/74 |
| | | | | 280/759 |
| 3,547,278 A * | 12/1970 | Tayler | ...................... | B66C 23/76 |
| | | | | 212/196 |
| 4,402,413 A * | 9/1983 | Sickler | ...................... | E02F 9/18 |
| | | | | 212/178 |
| 5,141,195 A * | 8/1992 | Toda | ...................... | B66C 23/74 |
| | | | | 212/178 |
| 5,332,110 A * | 7/1994 | Forsyth | ...................... | B66C 23/44 |
| | | | | 212/196 |
| 2007/0122261 A1* | 5/2007 | Hamaguchi | ...................... | B66C 23/74 |
| | | | | 414/729 |
| 2008/0053944 A1* | 3/2008 | Ramun | ...................... | B66C 23/72 |
| | | | | 212/195 |
| 2008/0203045 A1* | 8/2008 | Pech | ...................... | B66C 23/76 |
| | | | | 212/270 |
| 2008/0253875 A1* | 10/2008 | Yamamoto | ...................... | B66C 23/74 |
| | | | | 414/719 |
| 2009/0087266 A1* | 4/2009 | Styck | ...................... | B66C 23/44 |
| | | | | 405/154.1 |
| 2009/0297275 A1* | 12/2009 | Davis | ...................... | B66C 23/36 |
| | | | | 405/174 |
| 2010/0180475 A1* | 7/2010 | Ellett | ...................... | B66C 23/44 |
| | | | | 37/406 |
| 2011/0084044 A1* | 4/2011 | Camacho | ...................... | B66C 23/44 |
| | | | | 212/279 |
| 2012/0160795 A1* | 6/2012 | Liu | ...................... | B66C 23/74 |
| | | | | 212/178 |
| 2015/0139768 A1* | 5/2015 | Egawa | ...................... | E02F 9/18 |
| | | | | 414/719 |
| 2015/0210514 A1* | 7/2015 | Albinger | ...................... | B66C 23/76 |
| | | | | 212/279 |
| 2015/0210515 A1* | 7/2015 | Pech | ...................... | B66C 23/76 |
| | | | | 212/197 |
| 2016/0169413 A1* | 6/2016 | Camacho | ...................... | F16L 1/06 |
| | | | | 701/50 |
| 2017/0022034 A1* | 1/2017 | Iwazawa | ...................... | B66C 13/20 |
| 2017/0210432 A1* | 7/2017 | Cartechini | ...................... | B62D 49/085 |
| 2017/0355576 A1* | 12/2017 | Kolb | ...................... | B66C 23/74 |
| 2018/0044150 A1* | 2/2018 | Mori | ...................... | E02F 9/18 |
| 2018/0273353 A1* | 9/2018 | Herse | ...................... | B66C 23/16 |
| 2019/0144247 A1* | 5/2019 | Albinger | ...................... | B66C 13/16 |
| | | | | 701/50 |

* cited by examiner

PIPELAYER WITH QUICK ATTACH COUNTERWEIGHTS

CROSS-REFERENCE TO RELATED APPLICATIONS

This application claims priority to and benefit of CA Serial No. 2,974,272, filed Jul. 21, 2017; U.S. Provisional Application Ser. No. 62/536,594, filed Jul. 25, 2017 and CA Serial No. 2,983,834, filed Oct. 26, 2017, the contents of which are incorporated by reference in their entirety for all purposes.

FIELD OF THE INVENTION

The present invention relates to a pipelayer machine and more particularly a counterweight assembly and counterweights for pipelayer machines.

BACKGROUND

A pipelayer machine is a machine that is specially designed to lay sections of pipe in a trench to create a pipeline. Previously, cranes had been used to raise up pipe sections, move the pipe section over a trench and then lower the pipe section into the trench. However, the cranes were not very maneuverable and were commonly modified from cranes designed for other purposes in order to be used for installing the pipe sections in the trench. Eventually, excavators and crawlers began to be used to install pipe sections with kits being made and sold to convert an excavator or crawler to make them suitable for use in installing pipe sections in a trench. Eventually, purpose-made pipelayer machines were designed where the sole purpose of these pipelayer machines was the installing of pipes in pre-dug trenches.

A pipelayer machine will typically have tracks and a crawler body with an engine. A side boom can extend to one side of the pipelayer machine and the raising and lowering of the side boom is handled by a winch system. A counterweight assembly is typically provided on an opposite side of the pipelayer machine from the side that the boom is attached to in order to counterbalance the pipelayer machine against the weight of the pipe section and prevent the pipelayer machine from tipping over when the boom is used to raise and lower a pipe section into a trench.

These pipelayer machines are used to lay a pipe section in a trench by using the tracks to maneuver the pipelayer machine next to a trench in which the pipe section will be placed. A hook, which is suspended from the boom, is then used to connect to the pipe section and a winch system is used to raise the pipe section from the ground. Once the pipe section is raised off the ground, the boom can be moved to move the pipe section over the trench. When the pipe section is positioned over the trench, the hook is then lowered while the boom remains stationary to lower the pipe section into the trench. Commonly, a number of pipelayer machines will be used at the same time to raise and lower a single pipe section into the trench with the different pipelayer machines working in unison to raise, laterally move and lower a pipe section into the trench.

The counterweights are attached to the opposite side of the pipelayer machine than the boom is attached to so that the counterweights can be used to counteract the forces applied to the pipelayer machine by the lifting and laterally moving a pipe section with the pipelayer machine. These counterweights are simply heavy weights designed to attach to some sort of assembly so that the counterweights can be moved laterally outwards from the side of the pipelayer machine before the machine is used to lift the pipe section and move it laterally outwards from the pipelayer machine on the other side. By moving the counterweights outwards, the moment acting on the pipelayer from the counterweights is increased, countering the opposite moments acting on the pipelayer due to the boom and pipe section suspended from the boom.

However, these counterweights are usually installed on the pipelayer machine and removed at the worksite before and after the pipe section is placed in the trench, rather than these counterweights being left on the pipelayer machine all of the time. This requires the counterweights to be installed and removed repeatedly onsite in often less than ideal conditions. Any decrease in the time it takes to install and remove these counterweights can lead to significant time savings, since must be done on multiple machines repeatedly. Additionally, difficulties with counterweight removal delays the whole process and since multiple pipelayer machines are commonly used, problems with installing or removing these counterweights can delay the whole job.

Currently, pipelayer machines typically use a keyway where the counterweights must be raised and slid from the side over this specifically sized and configured keyway before the counterweights are secured in place. While this keyway securely attaches the counterweights to the pipelayer machine, it is difficult to align the counterweights with the keyway and requires these very heavy counterweights to be raised exactly to the keyway and then slid along the keyway very precisely. If for any reason the counterweights jam or otherwise get stuck (for example by foreign-object contamination, such as gravel) on this keyway, they can be very difficult to get unstuck.

Counterweights that can be relatively quickly and easily installed on the pipelayer machine yet still be securely attached are desirable.

BRIEF SUMMARY

In a first aspect, a pipelayer machine is provided. The pipelayer machine can include a main body having a first side and a second side, a first side track provided on the first side of the main body, a second side track provided on the second side of the main body, a side boom provided on the first side of the main body, a counterweight assembly provided on the second side of the main body, the counterweight assembly having a counterweight mounting frame and at least one counterweight comprising a body with a first side engageable with the counterweight mounting frame.

In a further aspect, a further pipelayer machine is provided. The pipelayer machine can include a main body having a first side and a second side, a first side track provided on the first side of the main body, a second side track provided on the second side of the main body, a side boom provided on the first side of the main body, a counterweight assembly provided on the second side of the main body and at least one counterweight. The counterweight assembly can include a counterweight mounting frame having a circular engagement mount, a frame body extending below the engagement mount and at least one lug flange extending below the frame body and having an aperture passing therethrough, at least one fixed member connected at a first end to the second side of the main body, at least one frame member pivotally connected at a first end to a second end of the at least one fixed member and a second end of the at least one frame member connected to the counterweight mounting frame, at least one support member pivotally connected at a first end inside the second side track and a second end of the at least one support member connected to the at least one frame member and an actuator connected between the second side of the main body and the at least one support member. The at least one counterweight can include a body with a first side having a side profile corresponding to the counterweight frame mount, an engagement hook on the side profile of the first side of the body, the engagement hook configured to engage with the engagement mount of the counterweight mounting frame engageable with the counterweight mounting frame and at least one protruding lug extending from the first side of body of the counterweight and having an aperture passing therethrough, the at least one protruding lug positioned to correspond with the at least one lug flange on the counterweight mounting frame so that the aperture in the at least one protruding lug aligns with the aperture in the at least one lug flange.

In a further aspect, a counterweight for connection to a counterweight assembly of a pipelayer machine is provided. The counterweight can include a body having a first side engageable with a counterweight frame of the counterweight assembly.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
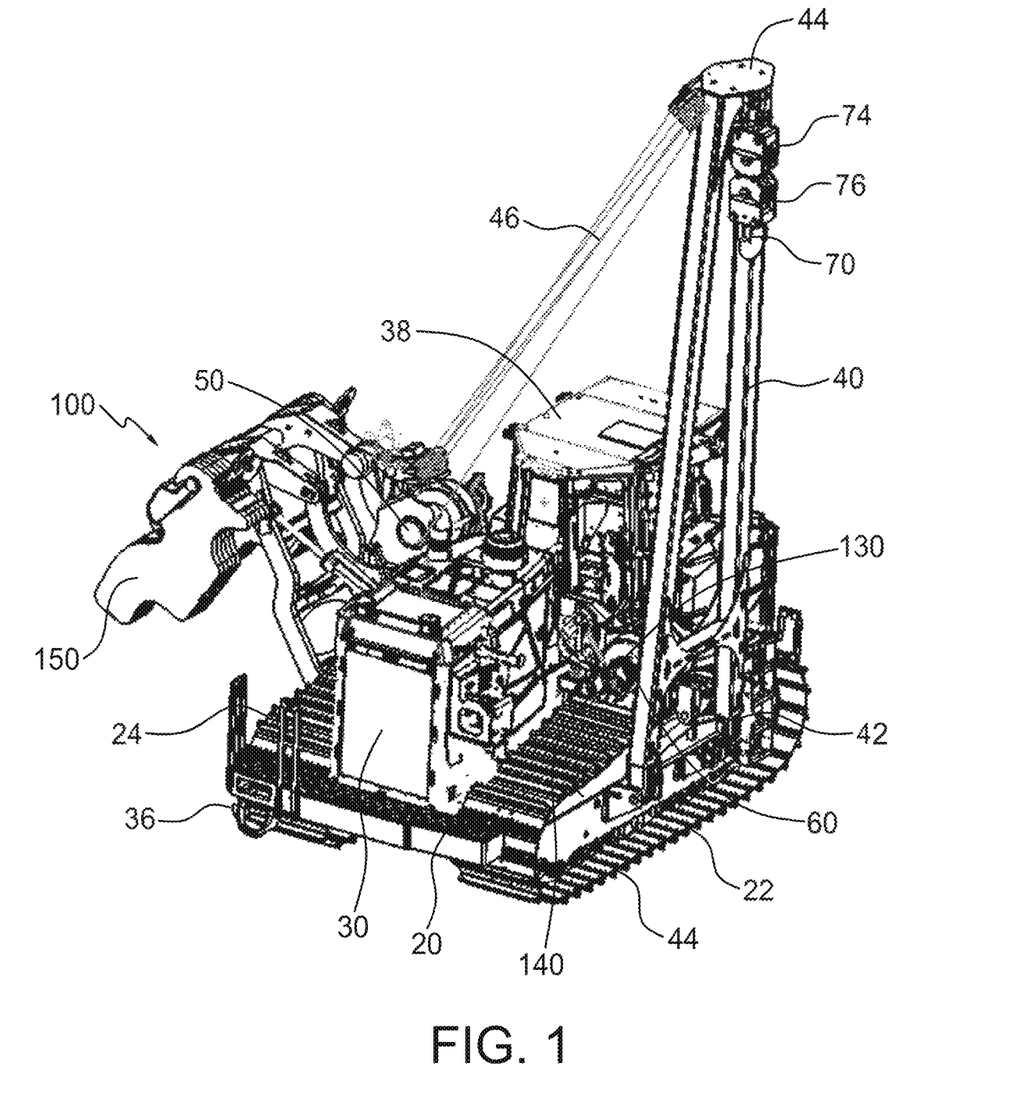
FIG. 1 is a perspective view of a pipelayer machine.

FIG. 1 illustrates a pipelayer machine 10 for placing sections of pipe section in a trench. The pipelayer machine 10 can include a main body 20, an engine 30, a first side track 34, a second side track 36, a cab 38, a side boom 40, a counterweight assembly 100, a boom winch 50, a hook winch 60 and a hook 70.

The main body 20 can have a first side 22 and a second side 24 and hold the engine 30 and the pair of tracks 34, 36. The cab 38 is provided for an operator to sit in and control the operation of the pipelayer machine 10.

The side boom 40 is used to support a pipe section that is lifted off of the ground by the pipelayer machine 10 and to move the pipe section laterally away from the pipelayer machine 10 over top of the trench so that the pipe section can be lowered by the pipelayer machine 10 into the trench. The side boom 40 can be pivotally connected at a proximal end 42 of the side boom 40 to a first side 22 of the main body 20 of the pipelayer machine 10 so that the side boom 40 extends laterally from the first side 22 of the main body 20. In one aspect, the proximal end 42 of the side boom 40 can be connected inside the first side track 34 on the first side 22 of the main body 20 so that the first side track 34 rotates around the proximal end 42 of the side boom 40.

In one aspect, the side boom 40 can have a triangular frame.

The boom winch 50 can be used to raise and lower the side boom 40. The boom winch 50 can be operatively attached to a distal end 44 of the boom 40 by a boom cable 46. The boom winch 50 can be attached to the main body 20 of the pipelayer machine 10 so that the boom cable 46 passes between the boom winch 50 and the distal end 44 of the side boom 40 in front of the cab 38 of the pipelayer machine 10.

The boom winch 50 can be wound to raise the boom 40 around its pivotally connected proximal end 42 or unwound to lower the boom 40 around the pivotally connected proximal end 42. Typically, the boom cable 46 is used in conjunction with a block and tackle assembly to increase the force applied to the boom 40 by the boom winch 50 to aid the boom winch 50 in raising the boom 40.

The hook winch 60 and hook 70 can be used to raise and lower a pipe section. The hook winch 60 can be connected to the hook 70 with a hook cable 72 and the hook winch 60 can be wound to raise the hook 70 and thereby any pipe section attached to the hook 70 or unwound to lower the hook 70. Typically, the hook cable 72 is used with a block and tackle assembly to increase the force the hook winch 60 can apply to a pipe section suspended from the hook 70.

Figure 2:
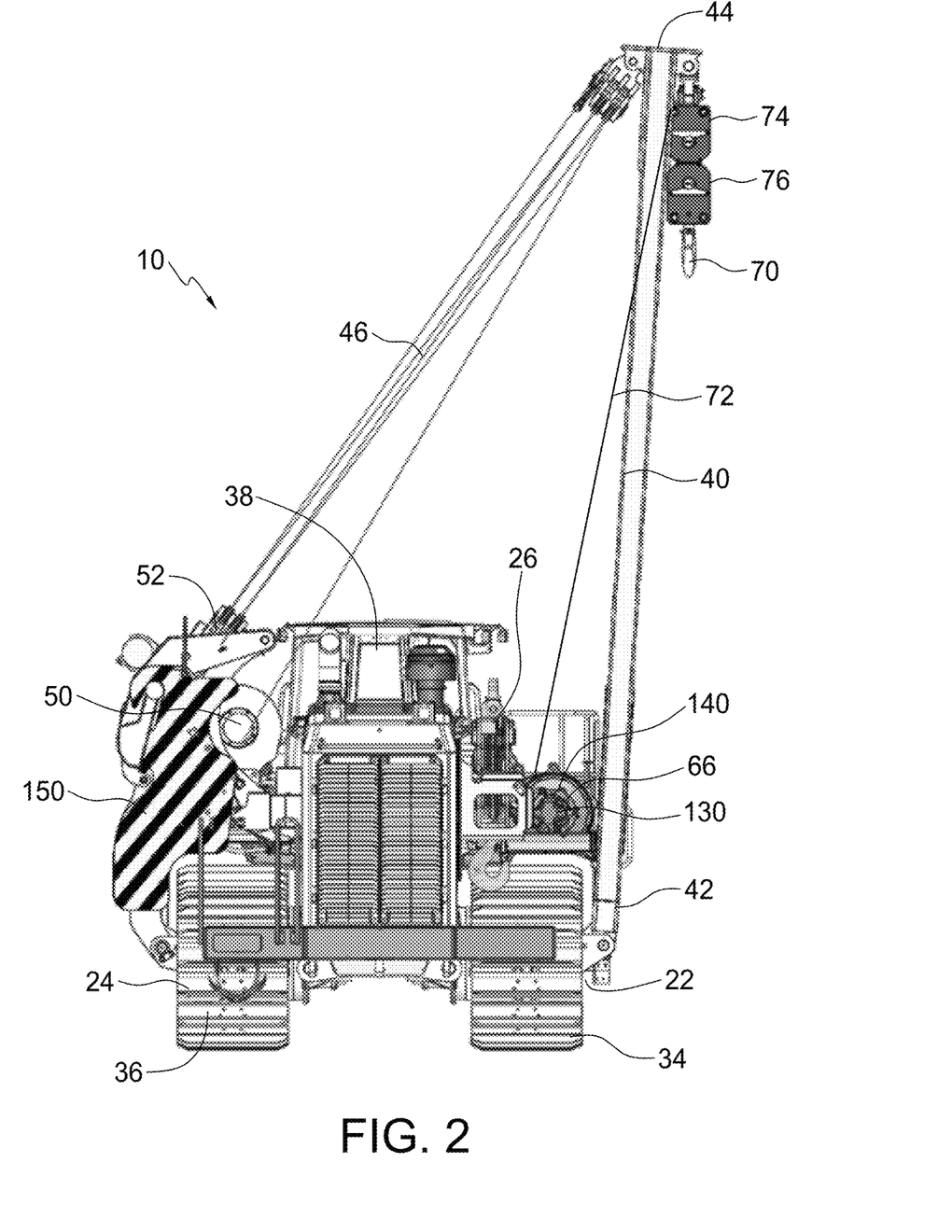
FIG. 2 is a perspective view of a counterweight assembly in a loading position.
Figure 3:
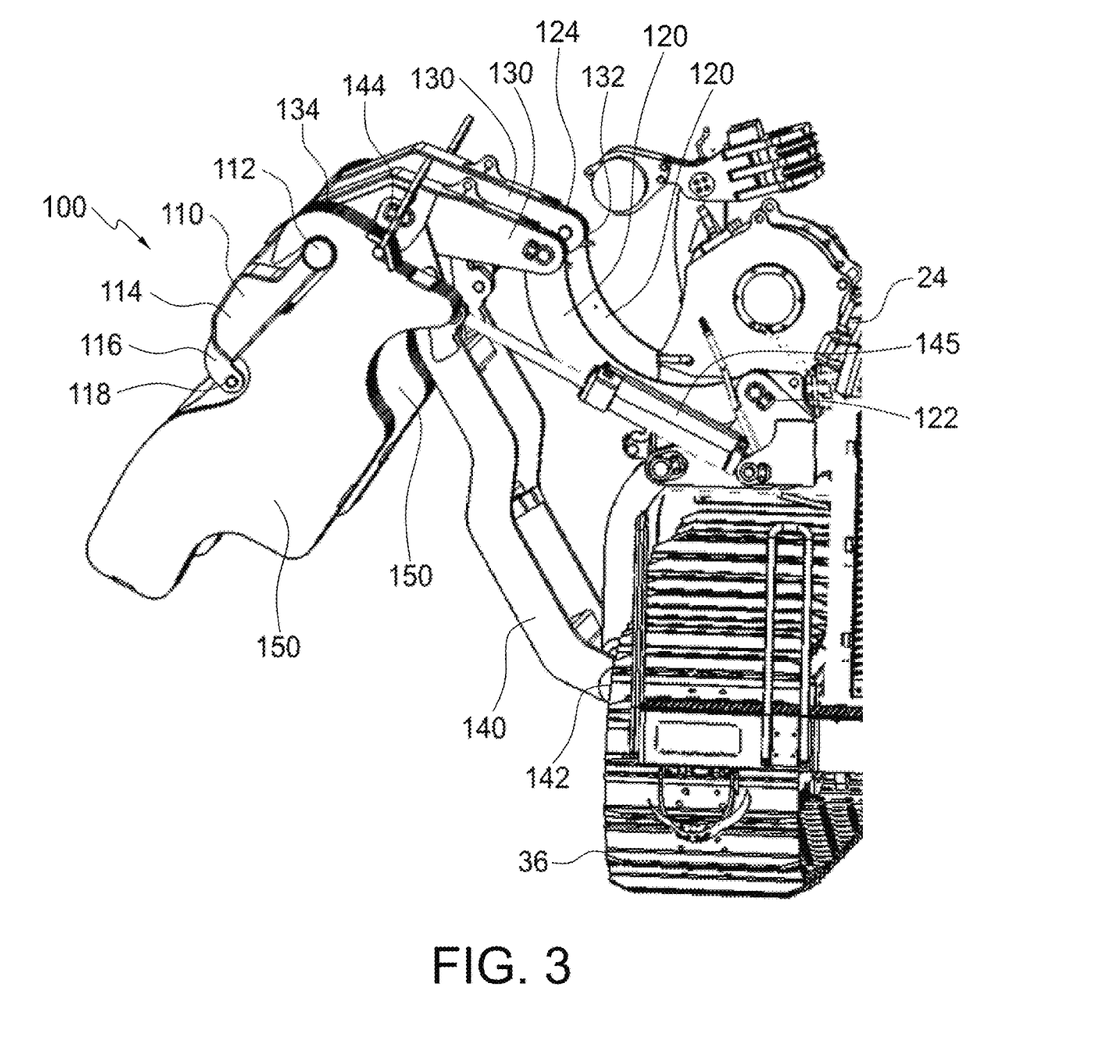
FIG. 3 is a perspective view of the counterweight assembly of FIG. 2 in an extended position.

Referring to FIG. 2, the counterweight assembly 100 is connected to the second side 24 of the main body 20 on an opposite side of the main body 20 from the first side 22. The counterweight assembly 100 is used to counterbalance the forces applied to the pipelayer machine 10 created when the pipelayer machine 10 lifts a pipe section off of the ground and moves it outwards laterally outward from the pipelayer machine 10 using the boom 40 to position the pipe section over a trench. The counterweight assembly 100 uses counterweights 150 and can move these counterweights 150 laterally away from the second side 24 of the main body 20 of the pipelayer machine 10 before the pipe section is picked up and moved laterally away from the first side 22 of the main body 20 of the pipelayer machine 10 as shown in FIG. 3 to counteract the forces applied to the pipelayer machine 10 by the weight of the pipe section and the boom 40.

Referring to FIGS. 2-5, the counterweight assembly 100 can include a counterweight mounting frame 110, a pair of fixed members 120, a pair of frame members 130, a pair of support members 140, an actuator 145 and one or more counterweights 150.

The counterweight mounting frame 110 is configured to mate with and hold the counterweights 150. The counterweight mounting frame 110 can have an elongate shape running parallel to the main body 20 of the pipelayer machine 10. The counterweight mounting frame 110 can have a circular engagement mount 112 provided on top of a frame body 114 with the frame body 114 extending downwards from the engagement mount 112. The counterweight mounting frame 110 can have one or more lug flanges 116 extending down below the frame body 114. Each lug flange 116 can have an aperture 118 passing through it to accept a pin 119.

The fixed members 120 can be connected at first ends 122 to the second side 24 of the main body 20. Second ends 124 of the fixed members 120 can be pivotally connected to first ends 132 of the frame members 130 so that the frame members 130 can be pivoted around their first ends 130 relative to the second ends 124 of the fixed members 120. The second ends 134 of the fixed members 130 can be connected to the counterweight mounting frame 110.

The support members 140 can be pivotally connected at first ends 142 to the second side 24 of the main body 20 of the pipelayer machine 10. In one aspect, the first ends 142 of the support members 140 can be pivotally connected inside the second side track 36 so that the second side track 36 rotates around the first ends 142 of the support members 140. Second ends 144 of the support members 140 can be connected to the frame members 130.

The actuator 145 can be connected between the second side 24 of the main body 20 of the pipelayer machine 10 and one of the support members 140 so that extending the actuator 145 will rotate the support members 140 around their first ends 142, forcing the frame members 130 to pivot upwards around their first ends 132, thereby moving counterweight mounting frame 110 outwards and rotating the counterweight mounting frame 110 upwards. In one aspect, the actuator 145 can be a hydraulic cylinder.

The counterweight assembly 100 can have an initial position, as shown in FIG. 2, where the counterweight mounting frame 110 is positioned adjacent the second side 24 of the main body 20 of the pipelayer machine 10. In the initial position, the engagement mount 112 is positioned above the frame body 114 and the frame body 114 extends below the engagement mount 112 and angles away from the second side 24 of the main body 20 of the pipelayer machine 10 as the frame body 114 extends along its length from the engagement mount 112. From this initial position, by extending the actuator 145, the positioning of the fixed member 120, frame member 130 and support member 140 can cause the counterweight mounting frame 110 and therefore the counterweights 150 attached to the counterweight mounting frame 110 to move outwards from the initial position shown in FIG. 2 laterally away from the second side 24 of the main body 20 of the pipelayer machine 10 and rotated upwards, into an extended position as shown in FIG. 3. By extending the actuator 145, the actuator 145 will force the support members 140 to rotate around their first ends 142, forcing the frame members 130 to pivot upwards around the first ends 132 of the frame members 130 since the first ends 132 of the frame members 130 are pivotally connected to the second ends 122 of the support members 120, thereby moving the counterweight mounting frame 110 outwards and rotating the counterweight mounting frame 110 upwards, away from being substantially vertical, into the extended or operating position shown in FIG. 3. From the extended position, the actuator 145 can be retracted to once again move the counterweight mounting frame 110 back towards the second side 24 of the main body 20 of the pipelayer machine 10 and into the more substantially vertical initial position to allow the removal and attachment of the counterweights 150 to the counterweight mounting frame 110.

In this manner, before the pipelayer machine 10 is used to pick up a pipe section using the hook 70 and then move the pipe section laterally using the boom 40 and hook 70 in conjunction, the actuator 145 can be used to move the counterweights 150 from the initial position into the extended position, thereby moving the center of gravity CG of the counterweights 150 laterally outwards from the second side 24 of the main body 20 of the pipelayer machine 10 to counterbalance the forces the pipe section will apply to the first side 22 of the main body 20 of the pipelayer machine 10 to try and prevent the pipelayer machine 10 from tipping over.

Figure 6:
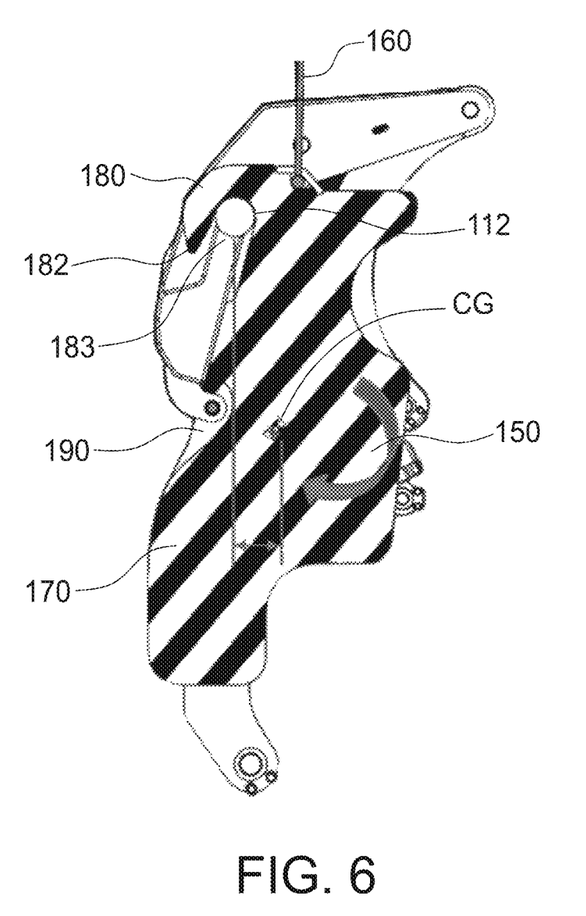
FIG. 6 is a front view of a counterweight.

Referring to FIG. 6, each counterweight 150 can have a lift eye 160, a body 170, an engagement hook 180 and a protruding lug 190.

The body 170 of the counterweight 150 is designed to be heavy and it can have a first side 171 that has a side profile designed to correspond with the counterweight frame mount 110. The engagement hook 180 is formed near the top of the first side 171 of the counterweight 150 and is sized to engage with the engagement mount 112 on the counterweight mounting frame 110. An inner opening 182 formed by the engagement hook 180 can have a shape that corresponds with an outer profile of the rounded engagement point 112 on the counterweight mounting frame 110. The inner opening 182 of the engagement hook 180 open at the bottom to form a passage 183 through which the engagement point 112 of the counterweight mounting frame 110 can pass to enter into and engage with the inner opening 182.

The body 170 of the counterweight 150 can extend rearwards and downwards from this engagement hook 180 so that a center of gravity, CG, is offset from the engagement hook 180 of the counterweight 150, with the center of gravity, CG, being positioned both vertically below the engagement hook 180 and horizontally spaced from the hook engagement 180.

The lift eye 160 can be pivotally attached to the body 170 of the counterweight 150 so that the lift eye 160 can be attached to a crane to lift and move the entire counterweight 150. The lift eye 160 can be positioned relative to the body 170 of the counterweight 150 so that the center of gravity CG of the body 170 of the counterweight 150 is positioned inline and vertically below the lift eye 160.

The protruding lug 190 can extend from the first side 171 of the body 170 of the counterweight 150. An aperture 191 can be provided passing through the protruding lug 190.

Figure 4:
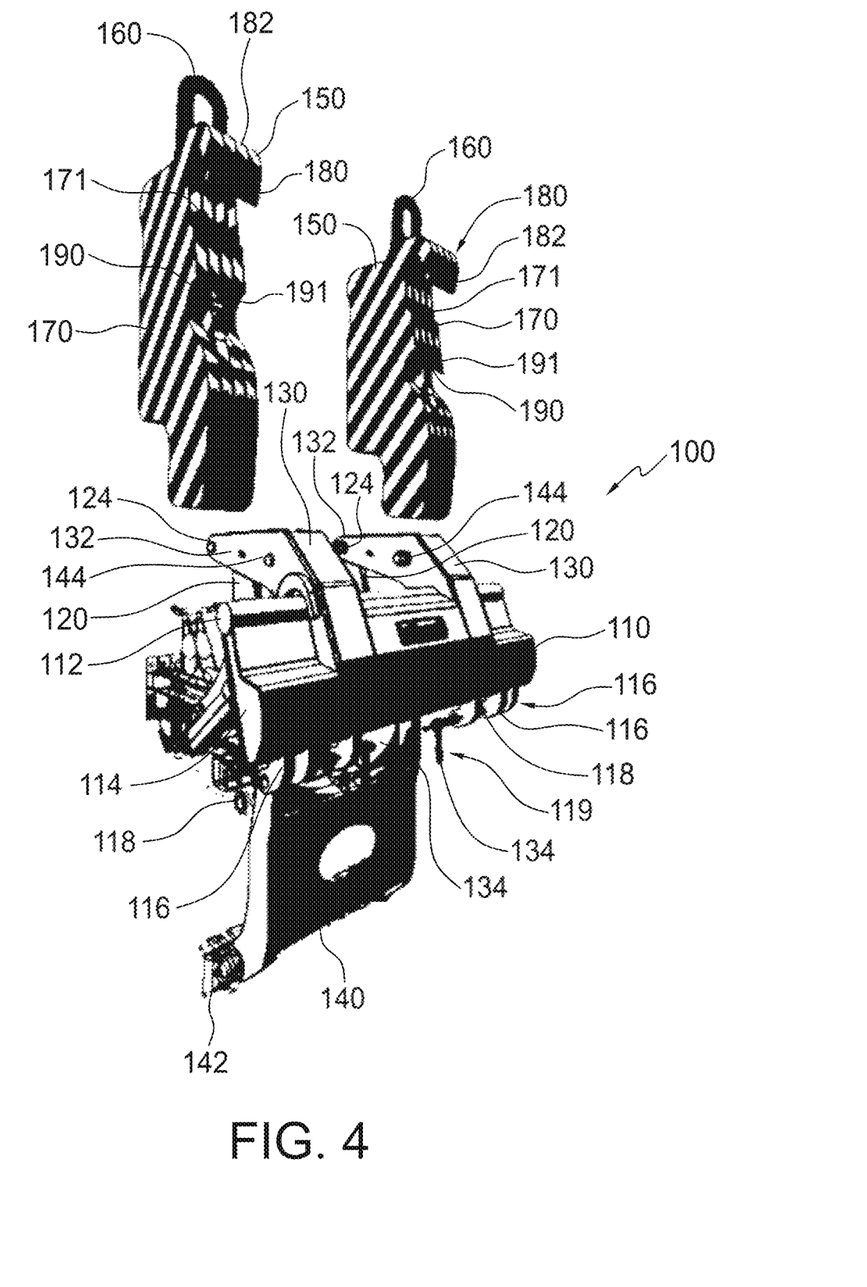
FIG. 4 is a perspective view of the counterweight assembly with the counterweights not attached.

Referring to FIG. 4, to install the counterweight 150 on the counterweight mounting frame 110 of the counterweight assembly 100, a crane can be used to lift the counterweight 150 by the lift eye 160. With the counterweight 150 suspended by the crane and not in contact yet with the counterweight mounting frame 110, the counterweight 150 should hang with the lift eye 160 being vertically aligned with the center of gravity CG of the counterweight 150. The crane can then be used to lower the counterweight 150 onto the counterweight mounting frame 110 by lowering the engagement hook 180 of the counterweight 150 on the circular engagement mount 112 on the counter weight mounting frame 110 so that the engagement hook 180 is partially surrounding the circular engagement mount 112.

Once the engagement hook 180 is in contact with the engagement mount 112 with the engagement mount 112 positioned in the inner opening 182 of the engagement hook 180, the crane can continue to lower the counterweight 150 by the lift eye 160. However, the engagement hook 180 will be prevented from continuing to move downwards by the engagement mount 112 on the counterweight mounting frame 110; instead the circular engagement mount 112 will only allow the engagement hook 180 to rotate around the circular engagement mount 112. Because the center of gravity CG of the counterweight is offset horizontally from the engagement hook 180, as the counterweight 150 continues to be lowered down by the crane to which the lift eye 160 is attached, the horizontal offset of the center of gravity CG from the engagement hook 180 generates a moment which will cause the counterweight 150 to rotate around the circular engagement mount 112 on the counterweight mounting frame 110 and cause the center of the circular engagement mount 112 to act as a pivot point for the counterweight 150. As the counterweight 150 continues to be lowered, the counterweight 150 will continue to pivot around the circular engagement mount 112 and the body 170 of the counterweight 150 will swing towards and against the counterweight frame mount 110 until the first side 171 body 170 of the counterweight 150 rests against the frame body 114 of the counterweight mounting frame 110 as shown in FIG. 6. The frame body 114 of the counterweight frame mount 110 can act as a stop to prevent further rotational motion of the counterweight 150 around the circular engagement mount 112.

Figure 5:
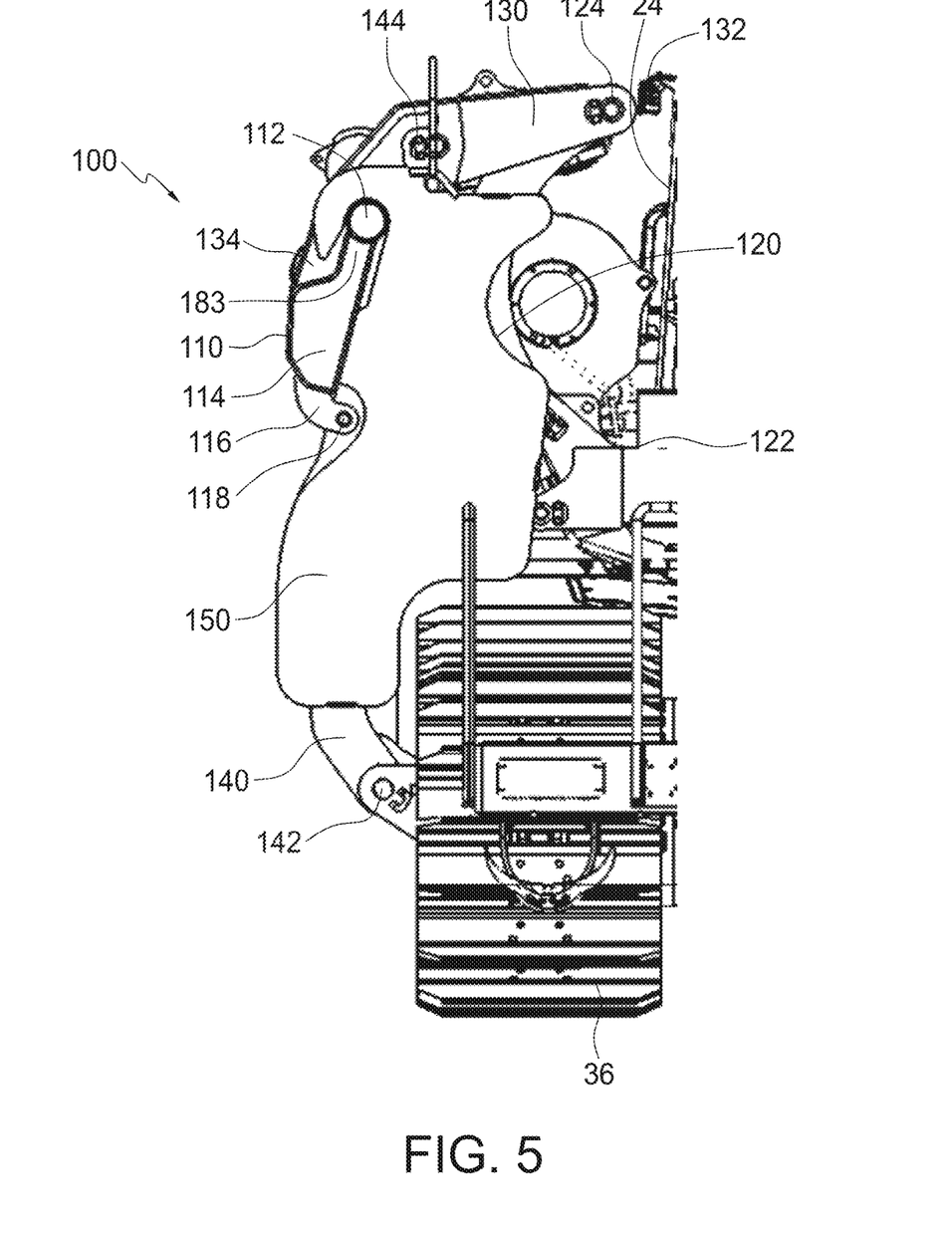
FIG. 5 is a front view of a counterweight mounted on the counterweight mounting frame.

When the first side 171 of the body 170 of the counterweight 150 swings up against the counterweight frame mount 110, the protruding lug 190 can be positioned adjacent one or more of the lug flanges 116 with the aperture 118 in the lug flange 116 aligned with the aperture 191 in the protruding lug 190. One of the pins 119 can be inserted through the aperture 118 of the lug flange 116 and the aperture 191 of the protruding lug 190 to secure the counterweight 150 in position against the counterweight mounting frame 110.

In one aspect, a pair of lug flanges 116 can correspond with each protruding lug 190 with the lug flanges 116 positioned on the counterweight mounting frame 110 so that the protruding lug 190 swings in between the pair of lug flanges 116 and the pin 119 can be inserted through the pair of lug flange 116 and the protruding lug 190 to secure the counterweight 150 in place on the counterweight mounting frame 110.

With the counterweight 150 securely in place on the counterweight mounting frame 110, the counterweight assembly 100 can be extended from its initial position, as shown in FIG. 2, to its extended position, as shown in FIG. 3, before a pipe section is picked up and moved laterally outwards by the pipelayer machine 10.

To remove the counterweight 150, the counterweight assembly 100 can be moved into its initial position using the actuator 145. The pin(s) 119 can then be removed from the apertures 118 in the lug flange 116 and the apertures 191 in the protruding lug 190 to release the counterweight 150. A crane can then be used to lift the counterweight 150 by the lift eye 160. By lifting the counterweight 150 by the lift eye 160, the counterweight 150 will pivot around the center of the rounded engagement mount 112 until the center of gravity CG of the counterweight 150 is positioned substantially vertically below the lift eye 160. Further lifting the counterweight 150 by the lift eye 160 will cause the engagement hook 180 to lift off of the rounded engagement mount 112 of the counterweight assembly mount 110 until the counterweight 150 is completely free of the counterweight assembly mount 110 and is hanging freely by the lift eye 160.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A pipelayer machine comprising:
    a main body having a first side and a second side;
    a first side track provided on the first side of the main body;
    a second side track provided on the second side of the main body;
    a side boom provided on the first side of the main body;
    a counterweight assembly provided on the second side of the main body, the counterweight assembly having a counterweight mounting frame; and
    at least one counterweight comprising a body with a first side having a side profile engageable with the counterweight mounting frame.

2. The pipelayer machine of claim 1 wherein the counterweight mounting frame has an elongate shape and extends parallel to the main body.

3. The pipelayer machine of claim 1 wherein the counterweight mounting frame comprises a circular engagement mount and a frame body extending below the engagement mount.

4. The pipelayer machine of claim 3 wherein the counterweight mounting frame further comprises at least one lug flange extending below the frame body, the at least one lug flange having an aperture passing therethrough.

5. The pipelayer machine of claim 3 wherein the side profile corresponds to the counterweight frame mount.

6. The pipelayer machine of claim 3 wherein the at least one counterweight has an engagement hook on the side profile of the first side of the body, the engagement hook configured to engage with the engagement mount of the counterweight mounting frame.

7. The pipelayer machine of claim 6 wherein the engagement hook has an inner opening, the inner opening open at a bottom of the engagement hook to form a passage to the inner opening.

8. The pipelayer machine of claim 7 wherein the passage is sized so that the engagement mount on the counterweight mounting frame can pass through the passage.

9. The pipelayer machine of claim 8 wherein the engagement hook partially surrounds the engagement mount when the at least one counterweight is positioned on the counterweight mounting frame.

10. The pipelayer machine of claim 9 wherein when the engagement mount is positioned in the inner opening of the engagement hook, the body of the counterweight can pivot around a center of the engagement mount until the first side of the body of the at least one counterweight contacts the frame body of the counterweight mounting frame.

11. The pipelayer machine of claim 6 wherein the body of the at least one counterweight extends rearwards and downwards from the engagement hook.

12. The pipelayer machine of claim 6 wherein the center of gravity of the at least one counterweight is offset from the engagement hook.

13. The pipelayer machine of claim 6 wherein the center of gravity of the at least one counterweight is positioned both vertically below the engagement hook and horizontally spaced from the engagement hook.

14. The pipelayer machine of claim 4 wherein the at least one counterweight further comprises at least one protruding lug extending from the first side of body of the counterweight and having an aperture passing therethrough, the at least one protruding lug positioned to correspond with the at least one lug flange on the counterweight mounting frame so that the aperture in the at least one protruding lug aligns with the aperture in the at least one lug flange.

15. The pipelayer machine of claim 14 wherein the at least one protruding lug is positioned in between a pair of lug flanges when the at least one counterweight is positioned on the counterweight mounting frame and the aperture in the at least one protruding lug is aligned with the apertures in the pair of lug flanges.

16. The pipelayer machine of claim 14 wherein the at least one protruding lug is positioned adjacent to the at least one lug flange when the at least counterweight is positioned on the counterweight mounting frame.

17. The pipelayer machine of claim 1 wherein the counterweight assembly further comprises: at least one fixed member connected at a first end of the at least one fixed member to the second side of the main body; and at least one frame member pivotally connected at a first end of the at least one frame member to a second end of the at least one fixed member and a second end of the at least one frame member connected to the counterweight mounting frame.

18. The pipelayer machine of claim 17 wherein the counterweight assembly further comprises: at least one support member pivotally connected at a first end of the at least one support member to the second side of the main body and a second end of the at least one support member connected to the at least one frame member.

19. The pipelayer machine of claim 18 wherein the first end of the at least one support member is connected inside the second side track.

20. The pipelayer machine of claim 19 wherein the counterweight assembly further comprises an actuator connected between the second side of the main body and the at least one support member.

21. The pipelayer machine of claim 20 wherein the actuator is operative to rotate the at least one support member around the first end of the at least one support member and when the actuator is extended to force the at least one frame member to pivot upwards around the first end of the at least one frame member and thereby cause the counterweight mounting frame to move outwards and the counterweight frame to rotate upwards.

22. The pipelayer machine of claim 20 wherein the actuator is a hydraulic cylinder.

23. The pipelayer machine of claim 20 wherein the actuator is operative to move the counterweight assembly between an initial position wherein the counterweight mounting frame is positioned adjacent to the second side of the main body and an operating position wherein the counterweight mounting frame is moved outwards and rotated upwards away from substantially vertical.

24. The pipelayer machine of claim 23 wherein when the counterweight assembly is in the initial position, an engagement mount is positioned above a frame body and the frame body extends downwards from the engagement mount and angles away from the second side of the main body.

25. The pipelayer machine of claim 23 wherein a center of gravity of the at least one counterweight is moved laterally outwards from the second side of the main body when the counterweight assembly is moved from the initial position to the operating position.

26. The pipelayer machine of claim 1 wherein the at least one counterweight further comprises a lift eye pivotally attached to the body of the at least one counterweight.

27. The pipelayer machine of claim 26 wherein the lift eye is positioned so that the center of gravity of the body of the at least one counterweight is positioned inline and vertically below the lift eye.

28. A pipelayer machine comprising:
a main body having a first side and a second side;
a first side track provided on the first side of the main body;
a second side track provided on the second side of the main body;
a side boom provided on the first side of the main body;
a counterweight assembly provided on the second side of the main body, the counterweight assembly comprising:
a counterweight mounting frame having a circular engagement mount;
a frame body extending below the engagement mount and at least one lug flange extending below the frame body and having an aperture passing therethrough;
at least one fixed member connected at a first end of the at least one fixed member to the second side of the at least one fixed member of the main body;
at least one frame member pivotally connected at a first end of the at least one frame member to a second end of the at least one fixed member and a second end of the at least one frame member connected to the counterweight mounting frame;
at least one support member pivotally connected at a first end of the at least one support member inside the second side track and a second end of the at least one support member connected to the at least one frame member; and
an actuator connected between the second side of the main body and the at least one support member;
at least one counterweight comprising:
a body with a first side having a side profile corresponding to the counterweight mounting frame;
an engagement hook on the side profile of the first side of the body, the engagement hook configured to engage with the engagement mount of the counterweight mounting frame engageable with the counterweight mounting frame; and
at least one protruding lug extending from the first side of body of the counterweight and having an aperture passing therethrough, the at least one protruding lug positioned to correspond with the at least one lug flange on the counterweight mounting frame so that the aperture in the at least one protruding lug aligns with the aperture in the at least one lug flange.

29. A counterweight for connection to a counterweight assembly of a pipelayer machine, the counterweight comprising: a body having a first side having a side profile engageable with a counterweight mounting frame of the counterweight assembly.

30. The counterweight of claim 29 wherein the side profile corresponds to the counterweight mounting frame.

31. The counterweight of claim 30 wherein the counterweight has an engagement hook on the side profile of the first side of the body, the engagement hook configured to engage with an engagement mount of the counterweight mounting frame.

32. The counterweight of claim 31 wherein the engagement hook has an inner opening, the inner opening open at a bottom of the engagement hook to form a passage to the inner opening.

33. The counterweight of claim 32 wherein the passage is sized so that the engagement mount on the counterweight mounting frame can pass through the passage.

34. The counterweight of claim 33 wherein the engagement hook partially surrounds the engagement mount when the at least one counterweight is positioned on the counterweight mounting frame.

35. The counterweight of claim 31 wherein the body of the at least one counterweight extends rearwards and downwards from the engagement hook.

36. The counterweight of claim 35 wherein the center of gravity of the at least one counterweight is offset from the engagement hook.

37. The counterweight of claim 36 wherein the center of gravity of the at least one counterweight is positioned both vertically below the engagement hook and horizontally spaced from the engagement hook.

38. The counterweight of claim 29 further comprising a lift eye pivotally attached to the body.

39. The counterweight of claim 38 wherein the lift eye is positioned so that a center of gravity of the body is positioned inline and vertically below the lift eye.

40. The counterweight of claim 29 further comprising at least one protruding lug extending from the first side of the body and having an aperture passing therethrough.

* * * * *

UNITED STATES PATENT AND TRADEMARK OFFICE
CERTIFICATE OF CORRECTION

Page 1 of 1

PATENT NO. : 10,850,952 B2
APPLICATION NO. : 15/815894
DATED : December 1, 2020
INVENTOR(S) : Michael Pletz et al.

It is certified that error appears in the above-identified patent and that said Letters Patent is hereby corrected as shown below:

In the Claims

Column 8, Line 52, Claim 14 reads "... from the first side of body of the ..." which should be deleted and replaced with "... from the first side of the body of the ..."

Column 8, Line 66, Claim 16 reads "... when the at least counterweight is positioned ..." which should be deleted and replaced with "... when the at least one counterweight is positioned ..."

Column 10, Lines 28-29, Claim 28 reads "... from the first side of body of the ..." which should be deleted and replaced with "... from the first side of the body of the ..."

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*